Oct. 9, 1956                J. A. KUREK                2,765,576
                              TACKLE BOX
Filed June 24, 1955                            2 Sheets-Sheet 1
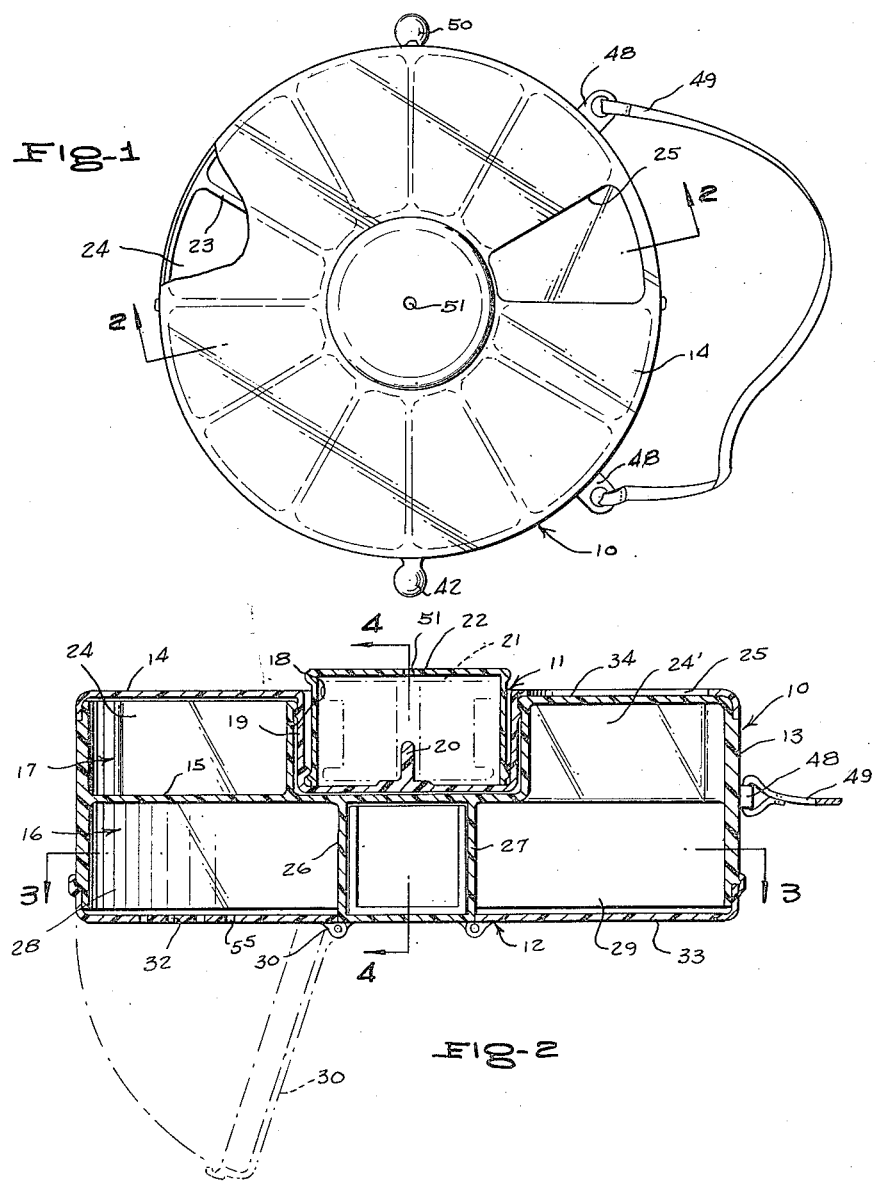
INVENTOR.
JOHN A. KUREK
BY
McMorrow, Berman + Davidson
ATTORNEYS Oct. 9, 1956  J. A. KUREK  2,765,576
TACKLE BOX
Filed June 24, 1955  2 Sheets-Sheet 2
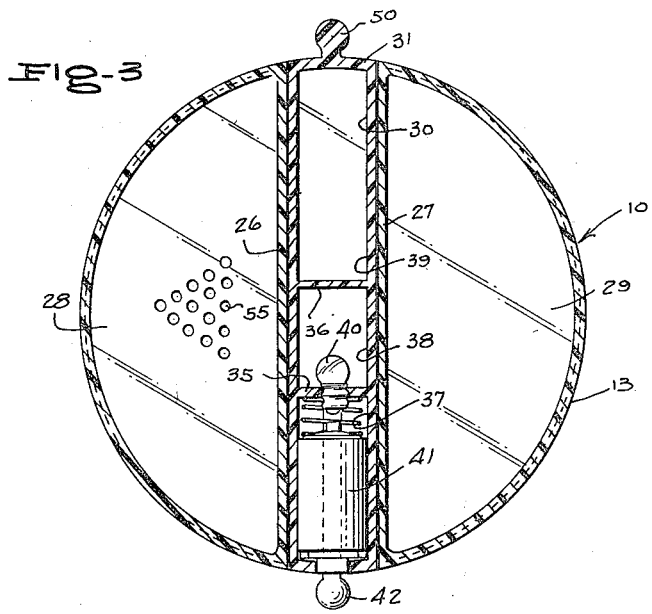
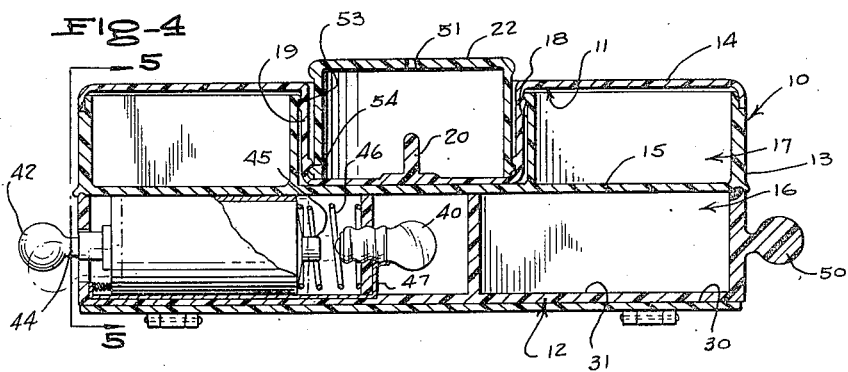
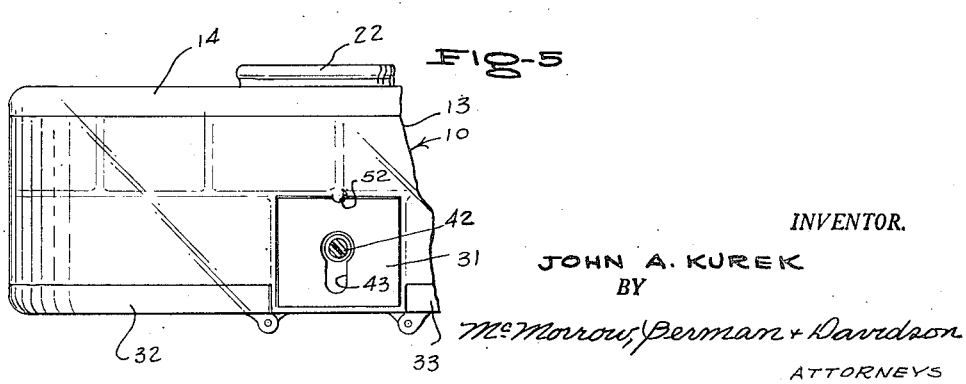
INVENTOR.
JOHN A. KUREK
BY
McMorrow, Berman + Davidson
ATTORNEYS

United States Patent Office 2,765,576
Patented Oct. 9, 1956

2,765,576

TACKLE BOX

John A. Kurek, Buffalo, N. Y.

Application June 24, 1955, Serial No. 517,845

3 Claims. (Cl. 43—54.5)

The present invention relates to a tackle box.

An object of the present invention is to provide a tackle box in which there are accessible compartments for the storage of appurtenances for fishing.

Another object is to provide a tackle box having a plurality of compartments readily accessible by rotating a cover.

A further object of the present invention is to provide a translucent tackle box having a source of illumination carried therein.

A still further object of the present invention is to provide a tackle box having a compartment with means therein for supporting a spool of fishing line and having a dispensing aperture in the cover of the compartment.

Yet another object of the invention is to provide a tackle box with many compartments, in one of which live or dead bait may be carried, one of the compartments having a support for a spool of line, leader, or other strand material and having an aperture through which the strand material is dispensed.

These and other objects and advantages of the present invention will be fully apparent from the following description when taken in connection with the annexed drawings, in which:

Figure 1 is a top plan view of the present invention with a portion of the cover broken away, Figure 2 is a sectional side view on the line 2—2 of Figure 1, Figure 3 is a sectional vertical view on the line 3—3 of Figure 2, Figure 4 is a sectional end view on the line 4—4 of Figure 2, and Figure 5 is a fragmentary view of elevation of the switch end of the drawer.

Referring in greater detail to the drawings in which like numerals indicate like parts throughout the several views, the tackle box of the present invention comprises a receptacle indicated generally by the reference numeral 10 having an open top, indicated generally by the reference numeral 11, and including a bottom 12 and an upstanding wall 13 extending about the bottom 12. A cover 14 closes the open top 11 of the receptacle 10 and is connected to the wall 13 for rotary movement in clockwise and counterclockwise directions.

A partition 15 is positioned within the receptacle 10 between the bottom 12 and the cover 14 and is secured about its boundary to the wall 13 and subdivides the receptacle 10 into a lower compartment, indicated generally by the reference numeral 16, and an upper compartment, indicated generally by the reference numeral 17. The upper compartment 17 has a well 18 positioned at its central portion with the opening of the well facing away from the partition 15. The cover 14 has a cup-shaped portion 19 extending into the well 18 which is conformably shaped to the latter with an understanding post 20 providing means for supporting a spool of fishing line, leader, or other strand material, the spool being shown in dotted lines in Figure 2 and indicated by the reference numeral 21. A cup-shaped closure member 22 is removably secured in the cup-shaped portion 19 of the cover 14 with its closed end spaced from the post 20.

A plurality of partition members 23 are positioned within the upper compartment 17 projecting from the axis of the compartment, each having its inner end secured to the well 18 and its outer end secured to the wall 13 and with the adjacent parts of the well 18 and the wall 13 subdividing the upper compartment 17 into a plurality of minor compartments, one of which is shown through the broken-away portion of the cover 14 in Figure 1 and indicated by the reference numeral 24. The cover 14 is provided with an opening 25 selectively registrable with each of the minor compartments upon movement of the cover in clockwise and counterclockwise directions.

A pair of partition strips 26 and 27 are arranged in spaced parallel relation and are positioned within the lower compartment 16 so that they bisect the latter, each of them having its ends secured to the adjacent portions of the wall 13. The spaces on each side of the strips form subsidiary compartments 28 and 29, the space between the strips forming a compartment for a drawer indicated by the reference numeral 30. The wall 13 has an opening at each end of the drawer compartment 30 between the adjacent ends of the partition strips 26 and 27 so that a drawer 31 may be inserted for sliding movement into and out of the drawer compartment 30.

Openable and closable doors 32 and 33 in the bottom of the receptacle are positioned adjacent each of the subsidiary compartments 28 and 29, respectively.

The partition 15 is provided with an opening adjacent one of the minor compartments 24 connecting that compartment, indicated by the reference numeral 24', in communication with the adjacent subsidiary compartment 29. A horizontally-disposed plate 34 extends above and is spaced from the free ends of the adjacent partition members 23 and the free ends of the adjacent portions of the well 18 and the wall 13 and closes the open top of the compartment 24'. The plate 34 is releasably received into the opening 25 in the cover 14 when the cover 14 is rotated so that the opening 25 is in registry with the plate 34 and provides a means for restraining the rotary movement of the cover 14 accidentally opening the compartments thereunder.

The wall 13, partition 15, well 18, partition members 23, the cover 14, and doors 32 and 33 are each fabricated of a transparent or translucent material such as clear or opaque plastic or the like and the drawer 31 is separated by other translucent partitions 35 and 36 subdividing the drawer into a battery compartment 37, a bulb compartment 38, and another storage compartment 39. The bulb compartment 38 is positioned centrally of the lower compartment 16 and when the bulb 40 is lit, the well and each minor and subsidiary compartment in the upper and lower compartments, respectively, and the storage compartment in the drawer are illuminated.

If desired, the drawer 31 with its battery 41 and the bulb 40 may be removed from the drawer opening as a unit and handled like a flashlight to enable the fisherman to select the desired fly, bait, or other tackle carried in the many-compartments of the tackle box of the present invention. A switch button 42 projects from the battery compartment 37 exteriorly of the drawer 31 and is movable downwardly into a keyhole slot 43 after it has been pressed inwardly. The narrow neck 44 of the button 42 is received in the slot 43 to hold the terminal end 45 of the battery 41 in contact with the base terminal of the bulb 40. A spring 46 biases the battery to "off" position. A metal strip 47 is in contact with the bulb base and connects the latter to the shell of the battery 41.

A pair of apertured lugs 48 on the side wall 13 are provided so that a shoulder strap 49 may be used to carry the tackle box of the present invention in an upright position with either the upper compartment or the lower compartment against the body of the user. A drawer pull 50 is secured to the other end of the drawer opposite to the switch button 42. An aperture 51 is provided in the center of the cup-shaped closure member 22 so that the strand material carried on the spool 21 may be unwound therefrom without removing the closure member. Detent means, such as the button or tab 52 on the side wall 13 restrains free movement of the drawer 31 from its compartment, it being understood that the material from which the tackle box is formed is sufficiently resilient to permit the drawer to be inserted or pulled beyond the tab 52. Similarly, the inner wall of the well 18 has a groove 53 receiving a cooperating ridge on the cover cup-shaped portion 19, and cooperating ridges 54 on the cup-shaped portion 19 of the cover and around the perimeter of the closure member 22 removably secure the latter to the cover.

Holes 55 are provided in the door 32 so that bait such as crickets, grasshoppers, and the like, may be carried in a live condition.

It will be seen that the present invention provides a compact bait or tackle box having a plurality of conveniently located compartments and that an illuminating means is provided for the compartments to be used either removed from its position centrally of the compartments or while installed in its position within the tackle box of the present invention.

What is claimed is:

1. A tackle box comprising a receptacle having an open top, and including a bottom and an upstanding wall extending about said bottom, a cover closing the open top of said receptacle and connected to said wall for movement in clockwise and counterclockwise directions, a partition positioned within said receptacle between said bottom and said cover and secured about its boundary to said wall subdividing said receptacle into a lower compartment and an upper compartment, a plurality of partition members positioned within said upper compartment and projecting from the axis of said compartment and subdividing said upper compartment into a plurality of minor compartments, said cover having an opening therethrough selectively registrable with said minor compartments upon movement of said cover in clockwise and counterclockwise directions, a pair of partition strips arranged in spaced parallel position within said lower compartment so that they bisect the latter compartment, the space between said partition strips forming a drawer compartment, and the spaces on each side of said strips forming subsidiary compartments, and an openable and closable door in the portion of the receptacle adjacent each of said subsidiary compartments.

2. A tackle box comprising a receptacle having an open top, and including a bottom and an upstanding wall extending about said bottom, a cover closing the open top of said receptacle and connected to said wall for movement in clockwise and counterclockwise directions, a partition positioned within said receptacle between said bottom and said cover and secured about its boundary to said wall subdividing said receptacle into a lower compartment and an upper compartment, said upper compartment being provided with a well at its central portion having its opening facing away from said partition, said cover being provided with a cup-shaped portion extending into said well and having means therein adapted to support a spool, a closure member removably secured to said cup-shaped portion, a plurality of partition members positioned within said upper compartment and projecting from the axis of said compartment and subdividing said upper compartment into a plurality of minor compartments, said cover having an opening therethrough selectively registrable with said minor compartments upon movement of said cover in clockwise and counterclockwise directions, a pair of partition strips arranged in spaced parallel relation positioned within said lower compartment so that they bisect the latter compartment, the space between said partition strips forming a drawer compartment, and the spaces on each side of said strips forming subsidiary compartments, and an openable and closable door in the portion of thhe receptacle bottom adjacent each of said subsidiary compartments.

3. A tackle box comprising a receptacle having an open top, and including a bottom and an upstanding wall extending about said bottom, a cover closing the open top of said receptacle and connected to said wall for movement in clockwise and counterclockwise directions, a partition positioned within said receptacle between said bottom and said cover and secured about its boundary to said wall subdividing said receptacle into a lower compartment annd an upper compartment, said upper compartment being provided with a well at its central portion having its opening facing away from said partition, said cover being provided with a cup-shaped portion extending into said well and having means therein adapted to support a spool, a closure member removably secured to said cup-shaped portion, a plurality of partition members positioned within said upper compartment and projecting from the axis of said compartment and subdividing said upper compartment into a plurality of minor compartments, said cover having an opening therethrough selectively registrable with said minor compartments upon movement of said cover in clockwise and counterclockwise directions, a pair of partition strips arranged in spaced parallel relation positioned within said lower compartment so that they bisect the latter compartment, the space between said partition strips forming a drawer compartment, and the spaces on each side of said strips forming subsidiary compartments, an openable and closable door in the portion of the receptacle bottom adjacent each of said subsidiary compartments, there being an opening in said partition connecting in communication one of the minor compartments in said upper compartment with the adjacent one of said subsidiary compartments in said lower compartment, and a horizontally-disposed plate spaced above and closing the open top of said one minor compartment and connected to the adjacent portion of said wall, said well, and the adjacent ones of said partition members, said plate being receivable in the opening in said cover when the latter is moved to a position having said opening in registry with said plate for releasably restraining movement of said cover.

References Cited in the file of this patent
UNITED STATES PATENTS

| | | |
|---|---|---|
| 2,076,157 | Perkins et al. | Apr. 6, 1937 |
| 2,591,271 | Levereth | Apr. 1, 1952 |
| 2,734,306 | Holdeman | Feb. 14, 1956 |